7963X

C. Bonnycastle.

Towing.

Patented Jan. 21, 1834.

N. PETERS, PHOTO-LITHOGRAPHER, WASHINGTON, D. C.

7963X

Charles Bonnycastle of Albemarle Co Virginia
Letters Patent

The Schedule referred to, in these Letters Patent and making part of the same, containing a description in the words of the said Charles Bonnycastle, himself of his improvement in the construction of Canals &c. and in the application of Locomotive Engines to Boats. Barges. and other vessels. especially designed to propel such Boats &c upon the Canals so constructed Be it Known that I Charles Bonnycastle, of the University of Virginia Albemarle County. State of Virginia, have made improvements in the construction of canals. and in certain machinery whereby boats may be propelled on the said Canals or other waters. both by the use of Steam, and that of other Locomotive powers. and whereby in certain places inclined planes may be substituted for Locks and other advantages obtained, the chief of which are enumerated in this Specification And be it Known that I obtain these advantages by such improvements as are herein described.

Figure 1:
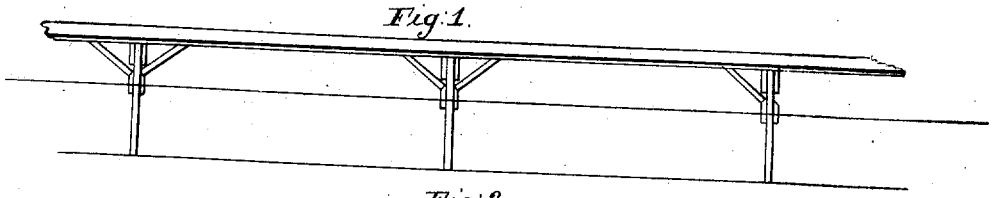
Figure 2:
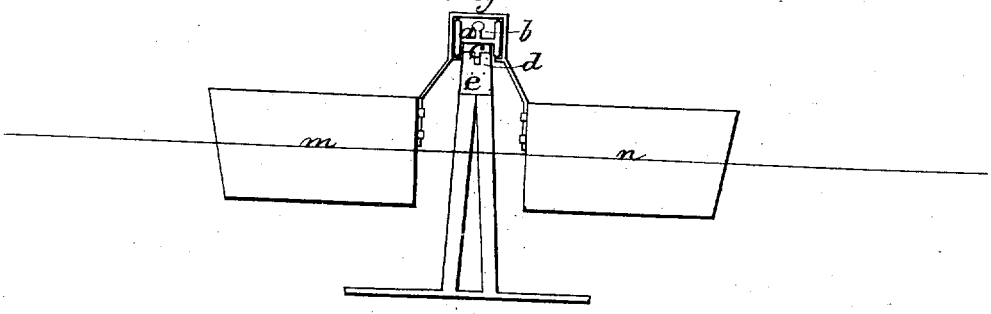
Figure 3:
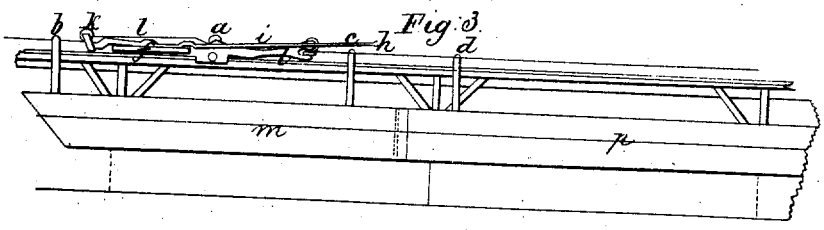

Fig 1 is a drawing representing on a scale of about 1/4 of an inch to a foot a rail of iron or other metal supported on a wooden or other frame, which frame is placed and secured in the middle of the Canal, dividing it longitudinally into two parts, or it is placed and secured in such canal, or in other waters according [illegible] the methods heretofore used, or which may hereafter be found most convenient for such cases. – Fig 2. is a section of the rail and frame shewing that is constructed of a plank c. laid horizontally, and strengthened by a plank. d. the breadth whereof is vertical, these two planks being supported and kept at a certain height above or immediately below the surface of the water by other ~~posts~~ plank, and posts. f. and. g. the lower extremities of which are fastened to a plank or sill. h. that lies on or below the bottom of the canal or other receptacle. The upper extremities of the planks f. & g. may be clamped by a board v. as represented in the figure. or may be connected by any other method of fastening commonly practised in such cases. And I claim moreover a right to construct this rail and frame and all such other parts of the machinery and its accessories herein described as are not specifically mentioned as of new inventions! - according to any methods that I may here after devise, or that may be commonly practised in similar cases securing the foundations by piles or otherwise at pleasure.

a. and b. Fig 2 are rollers working against edges of the rail and placed in a frame of iron, or other material that unites the two boats m. and n. Fig 3. is a second elevation of the rail and frame whereon is shewn an apparatus a to be used as a means of applying the powers of one or more Steam Engines or other prime motive powers, to propel boats, barges, or other vessels along the canal, or other water way. This apparatus a, I call, and shall hereafter designate as the "motor" —

Figure 4:
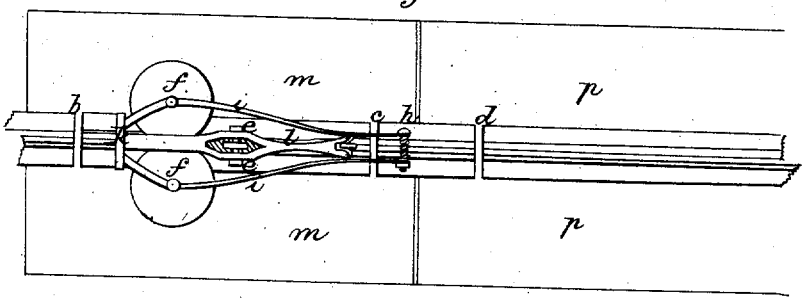

Now the chief parts of this motor, are two wheels f. and f figs 3 & 4. of the size commonly used for Locomotive Engines or of any other size that may be found convenient, which wheels are pressed against the vertical sides of the middle portions of the iron rail by a screw h. that unites the arms 1 & 2 of a frame wherein the axles of the wheels turn or rest.

The arms here described i and i are either secured to a strong bar k. that crosses the rail. or they are connected to that bar or frame by joints, in the first, case the screw h. acts upon the wheels by the elasticity of the arms, and in the second case it acts upon the wheels by the rigidity of their arms, whereby they become levers turning upon the joints aforesaid A second frame l. l. of iron or other material is attached to k. and serves to carry two axles, ee from which rods or chains or other instruments of connexion lead to the boats m and m, or to the other vessels to be drawn, and communicate to them the motion of the frame k. The action of the Steam Engines or other Locomotive Engines, I propose to communicate to the wheels by a connecting rod, or by any other method that I may hereafter devise, or by any method commonly used to communicate ~~motion~~ the action of Locomotive Engines to the wheels whereon their weight is supported. Either or both the Boats m, and m. together if necessary with other of the boats that follow are designed to carry the Engine or Engines and the fuel which it, or they require, and to these foremost boats are attached the boats following which are designed for the conveyance of goods or passengers. Now with regard to these boats, I design to make the Bows of the first, and Stems of the last on either side square, and to make them of such dimensions - that the bow of one boat shall enter freely within the space bounded by the two sides, and the bottom of the boat preceding supposing their sides and the bottom to be prolonged beyond the stem. And I further propose that each boat, on either side the last excepted shall have the sides and bottom so prolonged, and that the bows of one boat shall be placed within the prolongation of the sides and bottom of the preceding and that it shall be connected with the stem of this preceding boat by a joint or chain or by some other flexible instrument of connection.

Figure 5:
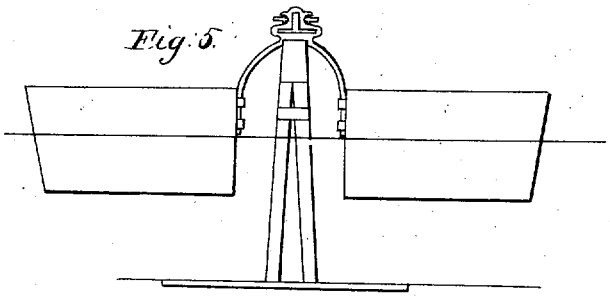

And I do also claim the right to connect - in this way any number of boats with those carrying the Locomotive Engines, and I further claim the right to connect the boats on one side of the rail with the boats upon the other side using for this purpose frames or straps b. c, a. Figs 3. & 4. which frames or straps may be furnished with rollers or with other apparatus designed to diminish the friction, and maintain the boats at an advantageous distance from the rail, according to the principles more fully exhibited in fig. 2. and 5. And further I claim the right to use in any part of the machinery such wheels rollers or other apparatus for diminishing friction as I may hereafter devise or as
may be commonly in use, the said apparatus being used when
necessary to keep certain parts in contact with the rail.
The advantages which I propose to obtain by the methods here
described are these. 1st It will enable me to apply steam and
other powers now not employed for such purpose, to the pro
pelling of Boats Barges &c along Canals, and other waters where
on vessels with paddle wheels cannot advantageously be
used — 2nd By keeping the Boats in the middle of the ca-
nal or in a certain line on the water it will permit one to increase
the length of the chain of boats diminishing the depth and
breadth in proportion whereby the resistance and the washing
of the banks will be greatly diminished, where great velo-
city and light freight are combined the apparatus fig 5-
will afford stability. . . 3d The shortness of the individ
ual Boats and the flexibility of the joints or chains that
connect them will permit the train to move on such
curves as are frequent in rail roads, or to pass over in-
clined planes. To facilitate the use of the latter I design
to employ trucks with wheels which shall be placed at the
foot of the inclined plane and upon rails that are continued
over the latter. Now these trucks being made by any of the kno
methods or by methods that I may devise to receive the boat;
will be caused either by the Locomotives or by stationary En
gines to pass along the rail aforesaid, and thus convey the
train to a canal beyond the inclined plane. And with
the view to use the Locomotive Engines in such cases I do clai
the right to continue the rail heretofore described as used
for the boats &c and to cause it to pass along what otherwise
would be the horse path. | And farther I do claim the ri
wherever such right may be advantageous to use all the
methods now commonly used, or that I may hereafter de

8271

7963X 183.

use for transporting such boats to the more elevated portions of the canal &c.. What I claim for my Invention and for which I solicit Letters Patent, is the use of one or more rail ways elevated above the surfaces of Canals rivers, lakes, or other waters or placed at small distances below those surfaces. the word surface herein designing the surface of the water, also the use of such method: of connecting boats as that herein described, and also the use of a motor having wheels clasping a rail. and detached from the Locomotive Engine And I do especially claim to myself the right of using this motor for propelling boats. barges or other vessels along canals, rivers lakes or other waters.. Lastly I claim & do reserve to myself the right to use a Locomotive Engine Traversing on one or more rails raised above the water or placed at small distances, below it. such engine being propelled if necessary by the adhesion of its own wheels.

Witnesses
J. A. (obliterated)
Th Johnson.

C. Bonnycastle (1732 words)

(Patented 21 January 1834)

Drawing